United States Patent [19]
Abbott

[11] 3,814,476
[45] June 4, 1974

[54] VEHICLE SEATS

[75] Inventor: Edward George Abbott, Birmingham, England

[73] Assignee: British Leyland (Austin-Morris) Limited, Longbridge, England

[22] Filed: Apr. 24, 1972

[21] Appl. No.: 246,736

[30] Foreign Application Priority Data
  Apr. 23, 1971  Great Britain.................... 11198/71
  Feb. 22, 1972  Great Britain...................... 8063/72

[52] U.S. Cl.................. 297/379, 248/395, 297/346
[51] Int. Cl........ B60m 1/08, B60n 1/02, A47c 3/00
[58] Field of Search............................. 180/110–113; 296/65 R, 65 A; 297/316, 340, 346, 379; 248/393, 397

[56] References Cited
UNITED STATES PATENTS
2,826,241  3/1958  Himka ................................ 297/341
3,576,347  4/1971  Vivian................................. 297/379
3,583,665  6/1971  Lohr.................................. 297/346

Primary Examiner—Casmir A. Nunberg
Attorney, Agent, or Firm—Thomas J. Greer, Jr.

[57] ABSTRACT

A vehicle seat having a forwardly foldable backrest pivoted to the seat frame has a manually releasable detent on the backrest and the detent is engageable with one of a series of fixed guides according to the fore and aft adjusted position of the seat. On forward tipping of the backrest, the detent moves along the selected guide which moves the seat forward to improve access to the rear seats whilst the detent may be released so that the seat may be adjusted and the detent then engages with another guide. The guides may comprise slots in a plate; the slots may be graded in length to prevent the top of the backrest hitting the steering wheel or facia, and the slots may include a vertical portion that is engaged by the plunger when the backrest is in the normal seating position to eliminate any vertical reaction between the slots and detent.

4 Claims, 4 Drawing Figures

VEHICLE SEATS

This invention relates to vehicle seats having a backrest that may be folded forward to allow, for example, access to the rear seat when the seat is fitted as the front seat in a two door vehicle.

In some cases, particularly when such a front seat is in its rearmost adjusted position, access to the rear seats is not all that may be desired even with the backrest folded forward due to the main body of the seat impeding access.

According to this invention a vehicle seat having a forwardly foldable backrest pivoted on a seat frame or base includes:

a. a manually releasable detent mounted on the backrest remote from the pivot axis thereof;

b. a series of guides adapted to be fixed relative to the vehicle structure, and adapted such that any one of the guides can be selectively engaged by the detent in accordance with the fore and aft position of the seat; the guides being disposed such that when the backrest is tipped forward the detent moves along the selected guide which thereby provides a reaction such as to cause the seat to move forwardly.

Preferably the detent comprises a spring loaded plunger and the series of guides comprise slots formed in a plate; the spring loaded plunger being such that it engages any one of the slots with which it is brought into register, whilst it can be manually withdrawn to allow the seat to be adjusted in a fore and aft direction to bring the plunger into register with another slot.

Furthermore, preferably at least that portion of each of the guides that is selectively engaged by the detent when the seat backrest is in a normal operative position is such that if a fore and aft force is applied to the seat the reaction of the selected guide on the detent does not include a vertical component. Thus when the guides comprise slots formed in a plate, each slot includes a vertical portion that may be selectively engaged by the detent when the seat back is in a normal operative position.

Moreover, preferably the series of guides are graded in length such that each provides a stop that prevents the top of the backrest - or any head restraint attached thereto - from hitting the facia or the steering wheel when the backrest is tipped forward whatever the fore and aft adjusted position of the seat.

A seat according to the invention may include a pivoting frame for fore and aft adjustment but conveniently the seat may be mounted on slides or runners.

A vehicle seat according to the invention will now be described, solely by way of example, with reference to the accompanying drawings in which.

Figure 1:
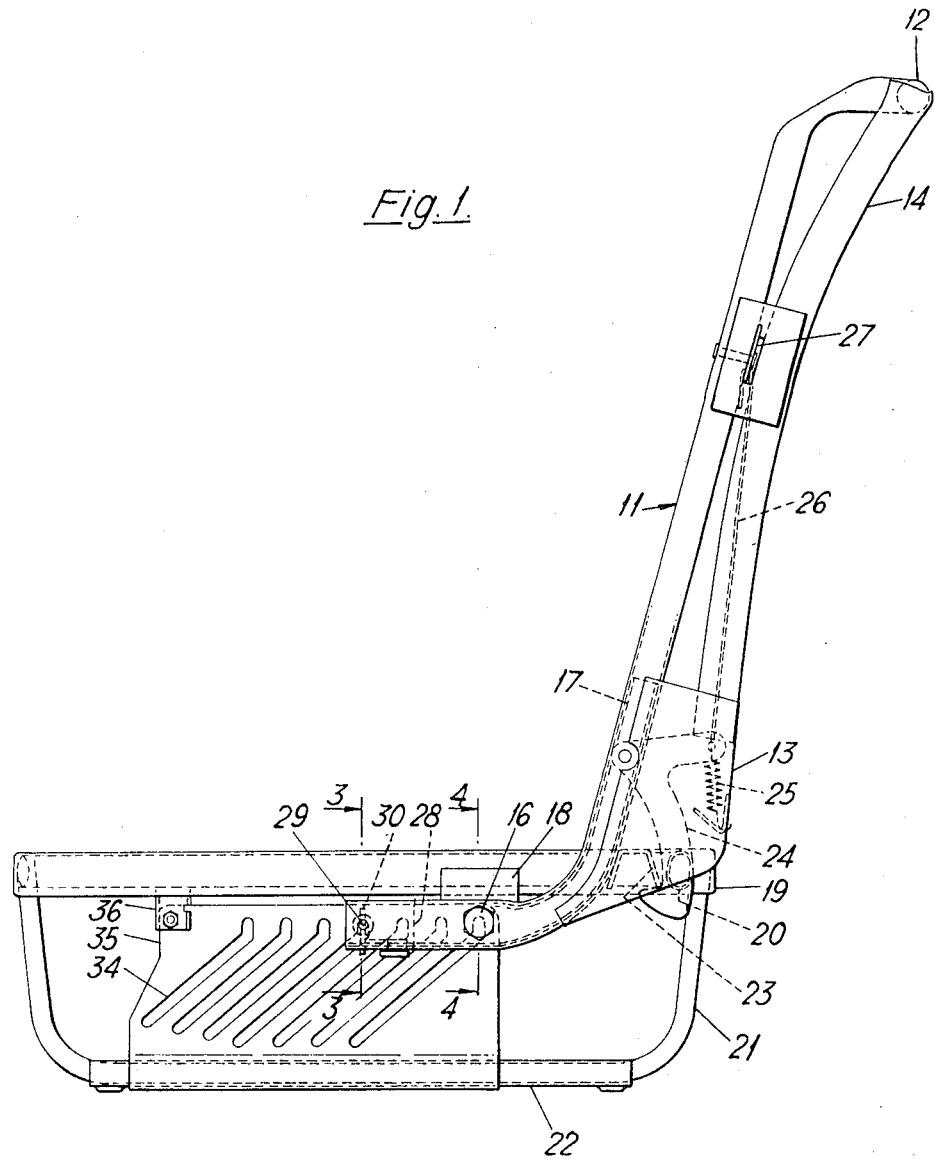
FIG. 1 is a side view of the seat.
Figure 2:
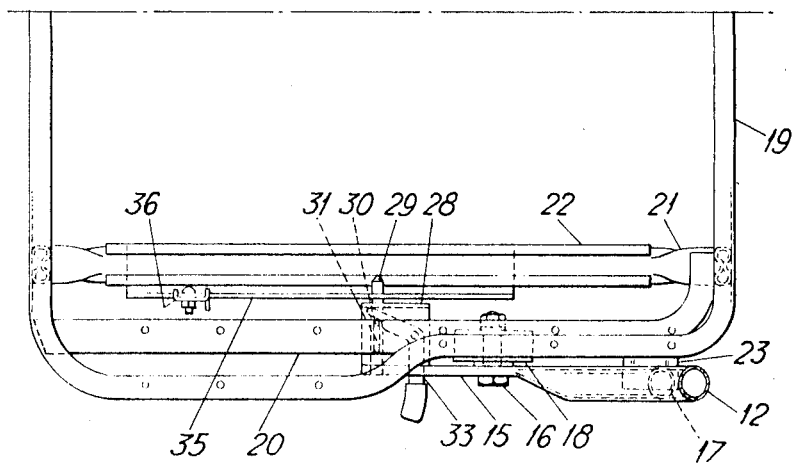
FIG. 2 is a half plan view of the seat shown in FIG. 1.
Figure 3:
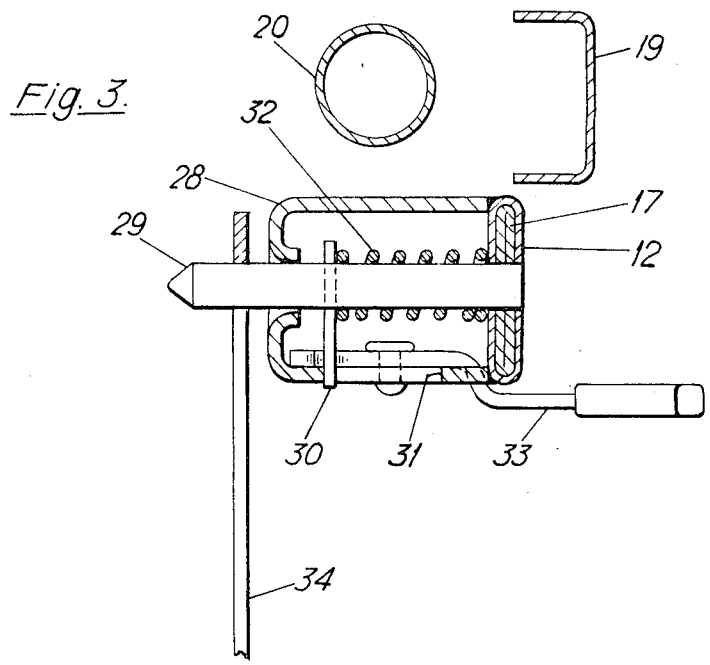
FIG. 3 is a fragmentary sectional view taken on the line 3 — 3 in FIG. 1.
Figure 4:
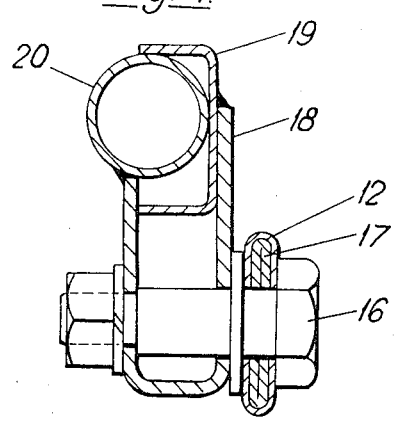
FIG. 4 is a sectional view taken on the line 4 — 4 in FIG. 1.

The seat has a backrest 11 comprising a hoop-like tubular member 12 to which sheet steel gussets 13 are welded on each side, and angular frame members 14 are welded to each gusset 13 on each side of the member 12. The lower ends of the backrest tubular member 12 are flattened at 15 and are pivoted to the seat frame by bolts 16; the lower ends of the backrest tubular member 12 being reinforced by additional tubes 17.

The bolts 16 are fixed through brackets 18 which are welded to a channel section cushion frame 19 and to reinforcing tubes 20, and the reinforcing tubes 20 are welded to the frame 19. The frame 19 is supported by tubular legs 21 welded to the frame, and the legs 21 slide in runners 22 adapted to be fixed to the floor panel of a vehicle.

The backrest 11 normally abuts against stop members 23 welded to the frame 19 where it is held by a catch 24 which is pivoted to the backrest tubular member 12 and held in engagement with the stop member 23 by a spring 25; the catch 24 is connected by a link 26 to a pivoted remote control lever 27 which protrudes from the side of the seat.

On one side of the seat, the tubular member 12 extends past the bolt 16 and carries a bracket 28 which is welded thereto. A detent pin 29 slides in the bracket 28 and the member 12; the detent pin 29 carries a pin 30 which engages in a slot 31 in the bracket 28 and the detent pin is spring loaded by spring 32. The pin 30 is engaged by a cranked seat-adjusting lever 33 which is pivoted to the bracket 28.

The detent 29 engages in one of a series of slots 34 formed in a plate 35, which is riveted to the seat runner 22, the particular slot that is engaged depending, of course, on the fore and aft position of the seat on its runners 22. Thus the seat may be readily adjusted by operating the cranked lever 33 to withdraw the detent pin 29, and when the seat has been moved to the required position the lever 33 is released so that the pin engages in another slot 34. A seat stop bracket 36 bolted to the plate 35 prevents excessive fore and aft movement of the seat.

When the seat is mounted in a vehicle, a passenger requiring access to the rear seats simply operates the remote control lever 27 to release the catch 24 and tips the seat backrest 11 forward. As the backrest 11 pivots forward the detent pin 29 moves down the slot 34 with which it is engaged thereby moving the whole seat forward and increasing the access to the back seats.

As will be seen in FIG. 1, the top end of the slots 34, which are engaged by the detent pin 29 in the normal sitting position of the backrest, are substantially vertical and aligned with the path of the detent pin, and therefore any reaction between the slots and the detent pin will not tend to move the backrest or have a vertical component acting on the plate. Moreover it will be seen that the other end of the slots 34 are foreshortened at the front end of the plate so as to restrict the degree of forward tipping of the backrest when the seat is in a forward adjusted position and thereby ensure that the top of the backrest, or any head restraint affixed thereto, will not hit the steering wheel or facia of the vehicle to which the seat is fitted.

What is claimed is:

1. A vehicle seat including:

a. a seat base frame slidably supported on runner elements;

b. a backrest pivoted on said frame for movement from a normal upright position to a forwardly tipped position;

c. a manually releasable detent mounted on said backrest remote from the pivot axis thereof;

d. a series of fixed guides fixed with respect to said runner elements arranged such that any one of said guides is selectively engaged by the detent according to the fore and aft position of said seat base frame, said guides slanting forwardly of the normal arcuate path of movement of said detent such that when said backrest is tipped forward, said detent is moved along a selected one of said guides, the selected guide providing a reaction that causes the seat base frame to slide forwardly with respect to the runner elements.

2. A vehicle seat according to claim 1 in which said detent comprises a spring loaded plunger and said series of guides comprise a series of slots formed in a plate; said plunger being engageable in any one of said slots with which it is brought into register by fore and aft movement of said seat and being manually releasable to allow fore and aft adjustment of said seat.

3. A vehicle seat according to claim 2 in which that portion of each of said slots that is engaged by said plunger when said backrest is in a normal upright position is disposed vertically, whereby if a fore or aft force is applied to the seat base frame it does not cause a reaction that includes a vertical component.

4. The vehicle seat of claim 1 wherein said guides are graded in length and have a stop portion at the end thereof that is engaged by the detent when the backrest is tipped forward, whereby the top of the backrest is prevented from hitting any other component of the vehicle when said backrest is tipped forward whatever the fore and aft adjusted position of said seat base frame.

* * * * *